United States Patent [19]

Sloniewsky et al.

[11] Patent Number: 4,662,863
[45] Date of Patent: May 5, 1987

[54] DOUBLE-ACTING POWER TRANSMISSION BELT

[75] Inventors: Alexander R. Sloniewsky, Charleston, S.C.; William A. Skura, Naugatuck, Conn.

[73] Assignee: Uniroyal Power Transmission Co., Inc., Middlebury, Conn.

[21] Appl. No.: 770,915

[22] Filed: Aug. 30, 1985

[51] Int. Cl.⁴ .............................................. F16G 1/28
[52] U.S. Cl. ..................................... 474/251; 474/266
[58] Field of Search ............... 474/251, 204, 205, 266, 474/267

[56] References Cited

U.S. PATENT DOCUMENTS

1,890,080 12/1932 Freedlander ......................... 474/251
4,514,179 4/1985 Skura ................................... 474/204

Primary Examiner—James A. Leppink
Assistant Examiner—Terry Lee Melius
Attorney, Agent, or Firm—H. W. Oberg, Jr.; Frank P. Grassler; C. H. Castleman, Jr.

[57] ABSTRACT

A double-acting power transmission belt having a plurality of elastomeric teeth positioned along both its inner and its outer peripheral surfaces, each such tooth possessing a certain spring rate, and inner and outer jackets, respectively, formed over the teeth and over the land portions between the teeth at each of the inner and outer peripheral surfaces, said inner jacket cooperating with the associated teeth such that the spring rate of each jacketed tooth on the inner one of the peripheral surfaces is from 1.2 times to 3 times the spring rate of a corresponding non-jacketed tooth.

20 Claims, 8 Drawing Figures

DOUBLE-ACTING POWER TRANSMISSION BELT

BACKGROUND OF THE INVENTION

This invention relates to improvements in double-acting, fabric covered, power transmission belts.

Double-acting power transmission belts have been known for many years. Such belts have been described in U.S. Pat. No. 3,673,883 (Adams), U.S. Pat. No. 3,338,107 (Kiekhaefer), U.S. Pat. No. 3,394,968 (Cicognani), U.S. Pat. No. 2,699,685 (Waugh), and French Pat. No. 1,556,839 (Pirelli).

To obtain maximum belt life in a synchronous belt, the teeth must be sufficiently rigid to carry the load and yet be able to deflect so as to mate properly with the grooves of the pulley. Since the internal strength and rigidity of the tooth elastomer is not sufficient to carry the load by itself and certainly does not itself exhibit sufficient abrasion resistance, a fabric cover is conventionally bonded on the surface of the belt. Historically, the fabric cover which has been employed was made from a so-called "stretchable" nylon fabric. Using stretchable nylon has made the production of such belts economical, using the method described in U.S. Pat. No. 3,078,206 (Skura). According to the above listed patents, double-acting belts, i.e. belts having teeth on both the inner and the outer peripheral surfaces thereof, are also conventionally made with stretchable fabric jackets and, in one case, namely the French Pat. No. 1,556,839, with a stretchable fabric jacket on only the inside and no jacket on the outside teeth.

It is also known, as stated for example in U.S. Pat. No. 4,514,179 (Skura), to make conventional one-sided toothed belts with a so-called "non-stetchable" fabric jacket. Such belts having a non-stretchable fabric jacket, as described in the latter patent, result in a belt having longer belt life and greater horse-power capability than similar belts with a jacket of stretchable fabric. The reason for this is believed to be that the conventional stretchable nylon jacket, which is made with loosely twisted crimped yarn, has its interstices substantially stretched and filled with tooth rubber during the belt molding process. Vulcanization locks the then stretched fabric in place causing it to become stiff and consequently reducing its ability to deform under load. Under operating loads the belt teeth are, however, forced to deflect and subject the thusly stiffened fabric cover to excessive dynamic stresses. This results in premature rupture of the rubber-filled fabric cover, particularly in the tooth root region, and early belt failure.

It is believed that in belts having a jacket of stretchable fabric, approximately 80% of the load on the belt tooth is transmitted by the fabric and only approximately 20% is transmitted by the rubber tooth itself. This ratio concentrates excessive load on the fabric, causing the early belt failure which has been experienced with such belts.

Double-acting power transmission belts have been constructed traditionally by using stretchable fabric for jacketing the teeth and land areas between the teeth on both working sides of the belt. If, however, approximately 80% of the load on the belt tooth is transmitted by the fabric and only approximately 20% by the rubber tooth itself, this characteristic becomes even more of a problem with double-sided, i.e. double-acting, power transmission belts than with single sided belts. In double-acting belts the belt is usually driven by a toothed drive pulley which engages the inner side, i.e. the inner peripheral surface, of the belt. At least one driven pulley also engages the same inner side of the toothed belt, while one or more additional driven pulleys engage the outer toothed surface of the double-sided toothed belt. Thus, it will be seen, in such double-sided belt systems, the drive pulley is in engagement with the inner toothed surface while at least one of the driven pulleys is in engagement with the outer toothed surface of the belt. Forces must, therefore, be transmitted from the teeth on the inner toothed surface to the teeth on the outer toothed surface while maintaining accurate synchronization between the teeth. Moreover, the "wrap" of the belt around the inner pulleys is commonly substantially greater than the "wrap" around the outer pulleys in such systems. Also, these drive systems are such that the torque exerted by the drive pulley on the inner side is substantially greater than the torque on any given driven pulley on the outer side of the belt. The prior art belts failed to provide a belt having characteristics which complement the foregoing system features.

It is an object of the present invention, therefore, to maximize, in a double-acting power transmission belt, the portion of the force transmitted by the elastomeric material of the tooth rubber of the teeth on the inner surface of the belt, through the body of the belt, and thence to the teeth on the outside of the belt.

It is another object of the present invention to provide a double-acting belt which will be able to transmit a greater load than the conventional double-acting belts, between a drive pulley at the interior, a driven pulley at the interior and a driven pulley at the exterior of such belt, while exhibiting increased belt life, or at least maintaining belt life substantially the same as that of conventional double-acting belts.

It is still another object of the invention to provide a belt which exhibits greater uniformity, greater flexibility and requires less power consumption, than the double-toothed belts of the prior art.

It is a concomitant object of the invention to provide a belt construction for double-acting belts which overcomes drawbacks of prior constructions and in which the water-resistant jacket material cooperates with the elastomeric belt of the belt teeth to provide a belt capable of use for relatively high horse power applications while exhibiting a belt life longer than can be expected with known double-acting belts under similar operating conditions, while at the same time exhibiting indexing and uniformity characteristics, between the teeth on opposite sides of the belt, which are superior to those of the conventional double-acting belts.

SUMMARY OF THE INVENTION

The objects of the invention are met by the provision of a double-acting, endless, synchronous power transmission belt having a generally centrally located longitudinally extending tensile member with elastomeric teeth located on opposite peripheral sides of the tensile member and having a layer of "non-stretchable" wear-resistant fabric positioned substantially along the periphery of the alternating land and tooth portions on the inner peripheral side of the belt and a layer of "stretchable" wear resistant fabric positioned substantially along the periphery of the alternating land and tooth portions on the outer peripheral side of the belt. The inner fabric is substantially non-stretchable, and can be treated with a resin which, when it sets, locks the yarns of the fabric to one another and substantially reduces the amount of tooth elastomer which can penetrate the interstices between such yarns during molding of the belt, whereby such inner fabric cover, even though it is much stiffer than the "stretchable" fabric on the outer side of the belt, retains a greater degree of flexibility after the belt fabrication than does the stretchable fabric whose interstices are substantially filled with tooth elastomer during the fabrication of the belt. In other words, the jacket on the inner side of the belt retains a greater degree of flexibility in combination with the elastomer of the belt teeth which it covers, than the combination would exhibit if the interstices of the fabric were substantially filled with elastomer, as is the case with the jacket on the outer side of the belt. The jacket on the outer side is conventional "stretchable" fabric.

The double-acting, positive drive, power transmission belt, according to the preferred embodiment of the present invention, has an elastomeric body portion having an inner and an outer peripheral surface, a tensile band embedded in the body portion, a first plurality of elastomeric teeth integral with the body portion and distributed along one of said peripheral surfaces and each possessing a predetermined spring rate, a second plurality of elastomeric teeth integral with the body portion and distributed along the other of said peripheral surfaces, a first fabric cover formed over the teeth and over the land portions between the teeth of said first plurality of teeth, a second fabric cover formed over the teeth and over the land portions between the teeth of said second plurality of teeth, said first fabric cover cooperating with said first plurality of teeth such that the spring rate of each tooth in said first plurality of teeth, covered with said first fabric, is from 1.2 times to 3.0 times said predetermined spring rate of the corresponding non-jacketed tooth. Preferably, the spring rate of each such tooth covered with such non-stretchable first fabric is from 1.4 times to 2.8 times the spring rate of the corresponding non-jacketed tooth. The first fabric and the resin used for locking the yarns thereof at the intersections thereof, are preferably of the type described in U.S. Pat. No. 4,514,179. According to that patent, the non-stretachable fabric remains substantially unstressed during the belt molding operation. The result is that during the molding operation the tooth elastomer does not substantially penetrate such fabric cover. Consequently, the non-stretchable cover has an improved capacity to deflect with the elastomeric tooth material under load. Thus, the "non-stretchable" fabric jacket on the inner side of the belt and the vulcanized tooth elastomer cooperate to form a composite tooth at the inner side of the belt, which will deform to the extent that both the elastomeric tooth and the fabric jacket share in absorbing the driving forces applied to the belt.

Thus, in accordance with the present invention there is provided a belt in which, it is believed, the rubber portion of each tooth in said first plurality of teeth transmits at least 30% of the load on such tooth and the load on the jacket covering such tooth is reduced to 70% or less of the total load applied. Such a more balanced construction exhibits greater resilience and less hysteresis than are possible with belts according to prior art constructions.

BRIEF DESCRIPTION OF THE DRAWINGS

Preferred aspects of this invention will be described with reference to the accompanying drawings, in which like numerals designate like parts in the various figures and wherein.

PREFERRED EMBODIMENT OF THE INVENTION

Figure 1:
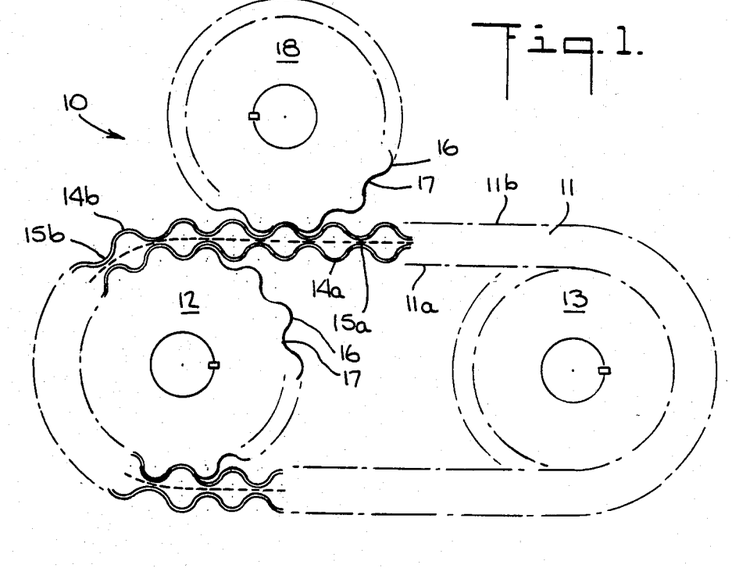
FIG. 1 is a side elevation of a typical power transmission system employing a double-acting belt which forms the subject of the present invention.

Referring now the drawings, in FIG. 1 a belt drive 10 is shown which includes a flexible double-acting power transmission belt 11 trained around and engaging, at the inner peripheral surface 11a thereof, a pair of gears or pulleys 12 and 13 and, at the outer peripheral surface 11b thereof, a third toothed pulley 18. The belt 11 includes a first plurality of alternating teeth 14a and grooves, having land portions 15a, on the inner side thereof and a second plurality of alternating teeth 14b and grooves, having land portions 15b on the outer side thereof. Pulleys 12, 13 and 18 are formed with alternating teeth 16 and grooves 17, extending generally axially thereof, which mesh with the belt teeth 14a and 14b, respectively.

Figure 2:
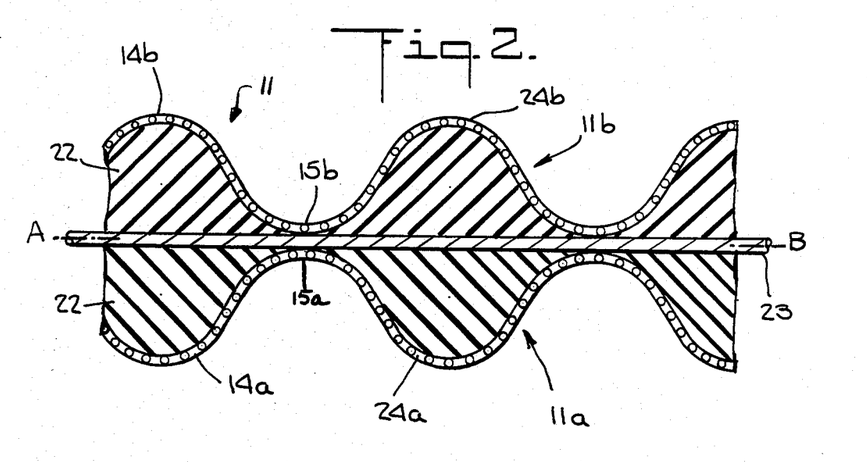
FIG. 2 is a longitudinal cross-sectional fragmentary view of a double-acting power transmission belt according to the invention.

As shown in FIG. 2 the belt 11 includes a body section 22 of elastomeric polymer. The body 22 of belt 11 includes a reinforcing tensile layer or tensile member, comprised of a plurality of longitudinally extending and horizontally spaced, tensile cords 23. The tensile cords may comprise essentially inextensible material such as wrapped stands of glass fiber or steel, to provide the belt with the necessary longitudinal strength and stability. The first plurality of belt teeth 14a are of substantially uniform height and are integrally formed in the inner peripheral surface of the body 22, with the teeth extending transversely of the belt 11 and spaced from one another by land portions 15a.

The second plurality of belt teeth 14b, also of substantially uniform height, are integrally formed on the outer surface 11b of the body 22, with the teeth 14b extending transversely of the belt 11 and spaced from one another by land portions 15b and being precisely indexed in opposition to the teeth 14a on the inner side of the belt body 22.

The tensile cords 23 are disposed substantially on the dedendum line AB of both the teeth 14a and the teeth 14b of the belt 11, as is well known practice in regard to synchronous drive belts of conventional construction. These tensile cords function as the main load carrying member of the belt. The materials which may be used for the tensile cords, as well as the elastomer compositions which may be used for the elastomer body and tooth portions of the belt in accordance with the invention, are the same as those described in U.S. Pat. No. 4,514,179, referred to above, the full disclosure in which is hereby incorporated herein by reference.

The first plurality of teeth, namely teeth 14a, and the land regions 15a separating those teeth, positioned on the inner peripheral surface 11a of the belt, are covered by a jacket 24a, while the teeth 14b and their respective land regions 15b, on the outer peripheral surface 11b of belt 11, are covered by a jacket 24b. The jacket 24a, on the inner peripheral surface of the belt, is preferably made from the same materials and in the same manner and is assembled with the elastomeric portion of the belt in the same manner as described with respect to "non-stretchable" fabric in U.S. Pat. No. 4,514,179. The outer jacket 24b, on the other hand, may be made from the traditional so-called "stretchable" fabric. According to the preferred embodiment of the invention, the wear-resistant jacket 24a which forms the inner peripheral surface of the belt 11 is a fabric which, prior to being formed into a component portion of the belt, is treated with a thermosetting resin which is thereafter heat-set to stabilize the structure of the fabric. After being heat set, the fabric 24a is in a non-stressed, relaxed condition, and it is placed into and made to conform to the shape of the toothed outer surface of a conventional cylindrical mold member (not shown), as described below.

As shown in FIG. 1, the double-acting belt 11, according to the invention, is conventionally used by being wrapped around a drive pulley 12, the teeth 16 of which are in engagement with the teeth 14a on the inner peripheral surface of belt 11, for driving the latter. In the conventional power transmission system of this type, at least one driven pulley 13 is also in engagement with the inner peripheral teeth 14a of the belt, while at least one additional driven pulley 18 has its teeth in engagement with the teeth 14b distributed along the outer peripheral surface 11b of belt 11. Also, as may be seen from FIG. 1, the amount of contact between the inner pulleys, such as pulleys 12 and 13, and the inner teeth 14a of the belt is generally substantially greater than the amount of contact between an outer pulley, such as pulley 18, and the outer belt teeth 14b meshing therewith.

Since the drive load represents the sum of all driven loads, the driver side of the belt, i.e. the inner side, is subjected to high stresses. While not shown in FIG. 1, for the sake of simplicity, in most common usages of double-acting belt systems, the multi-pulley arrangement is of serpentine configuration of the belt within the drive. Thus, for example, the belt 11 may be relatively substantially longer than shown in FIG. 1 and pulley 13, instead of being located horizontally spaced from pulley 12 may be in a position where it is horizontally spaced from pulley 18 instead, thus resulting in a longer arc of contact betwen the outer peripheral surface 11b of the belt and the pulley 16. This, of course, results in appreciably more flexing of the belt during use since, if the belt 11 follows such a serpentine path it would be flexed in directions opposite to the direction of flex which it undergoes when it travels around inner pulleys 12, 13.

It must be recognized in this connection that for most conventional uses the serpentine type pulley drive configuration is much more common with double-toothed, i.e. double-acting, belts. Conventional timing belts having teeth on only one surface thereof are, typically, not required to flex in opposite directions to the extent desribed above in connection with double-acting belts.

A belt having a "non-stretchable" jacket on the inner peripheral surface thereof and a "stretchable" jacket on the outer peripheral surface thereof will have teeth 14b, on the outer side, which are more rigid than the corresponding teeth 14a, on the inner side. These inner teeth 14a are covered with a non-stretchable fabric 24a which cooperates with the tooth elastomer, making such inner teeth 14a sufficiently resilient so as to carry a larger portion of the load than is the case with the outer teeth having a jacket made from stretchable fabric.

By the use of a "non-stretchable" jacket for the inner peripheral teeth of a double-tooth belt and the use of the conventional "stretchable" jacket for the outer peripheral teeth of the double-toothed belt, the use of the belt in drives requiring serpentine shaped paths for the belts is greatly facilitated. Thus, the belt according to the invention is particularly advantageous in drives in which at least one driven pulley cooperates with the teeth at the outer side of the belt and such pulley is positioned such as to require the belt to follow a generally serpentine path, resulting in frequent reverse flexure of the belt during operation. This can now be accomplished with the double-acting belt according to the present invention without having to reduce the horsepower load capacity of the belt and without experiencing a reduction in belt life but, most importantly, with only minimal effect on the accuracy of indexing between the inner teeth and the outer teeth of the belt.

As explained more fully in U.S. Pat. No. 4,514,179, the non-stretchable jacket is formed with a fabric 24a treated with a resin such as resorcinol formaldehyde latex ("RFL") which is then heat-set. As a result, the finished first plurality of belt teeth 14a, jacketed with such fabric, exhibits a greater resiliency, i.e. lower tooth Spring Rate ("K"), than is exhibited by the second plurality of teeth 14b on the outer side 11b of the belt, which teeth are covered with a jacket 24b of "stretchable" fabric. Thus, in a belt in which the first teeth when covered by a jacket made of non-stretchable fabric (as herein defined) have, for example, a spring rate of about 3 times the spring rate which those same first teeth have when non-jacketed, the second teeth when covered by a jacket made of stretchable fabric (as herein defined) would have, for example, a spring rate greater than 3 times the spring rate which those same second teeth have when non-jacketed, with the result being that the jacketed second teeth are stiffer or less flexible than the jacketed first teeth.

As used herein, tooth Spring Rate (K) is defined as the load (F) applied to the tooth, per inch of the belt width, divided by the corresponding belt tooth deformation in inches. The belt tooth deformation is a measure of the deformation of a tooth under a given load. The manner of measuring tooth deformation and determining the Spring Rate (K) for a given belt has been described in U.S. Pat. No. 4,514,179.

An additional advantage of a double-acting belt constructed with a non-stretchable jacket 24a on the inside teeth 14a and a stretchable jacket 24b on the outside teeth 14b is that, as alluded to above, the stretchable jacket 24b actually results in "stiffer" teeth while the "non-stretchable" jacekt actually results in more flexible teeth. The more flexible teeth are advantageous on the inner side of the belt since there is a larger amount of "wrap" of the belt around the drive as well as the driven pulleys on the inner side of the belt than the normally encountered "wrap" of the outer side of the belt with respect to an outer pulley such as pulley 18. Since only very few of the outer teeth 14b of the belt are normally in contact with the pulley 18, a much stiffer tooth is preferable here than on the inner side 11a of the belt. The non-stretchable jacket 24a over the inner teeth results in the inner teeth being more flexible and, while facilitating the greater "wrap around" requirement, also provides more torque capability on the inside where the drive pulley 12 is located.

Figure 3:
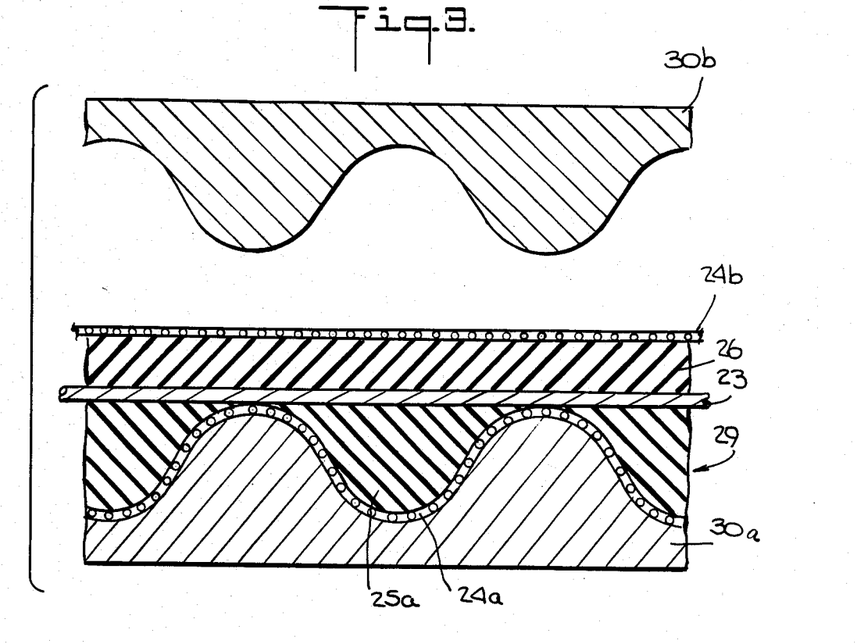
FIG. 3 is a longitudinal cross-sectional fragmentary view of opposed flat mold sections for forming the outer toothed side of a double-acting belt according to the invention, with the pre-form component of such belt positioned therebetween prior to final molding.

The belt is manufactured in several stages. First, a pre-form is made substantially in accordance with the method for making a pre-form for a one-sided belt described in U.S. Pat. No. 4,514,179. Such pre-form is preferably made on a drum shaped pre-form mold in which the non-stretchable fabric is positioned to lie against and in conformance with the grooved surface at the periphery of the drum. Elastomer, for example neoprene rubber, is then pressed against the fabric, forcing the latter against the grooved surface of the drum so as to fill out the spaces 25a (FIG. 3) between the adjacent ridges, thus forming the teeth at the inner surface of the pre-form. The pre-form is then removed from the pre-form mold. A predetermined length of the pre-form is then placed on a circular mold, and tension cord 23 is wound around the elastomer at the outside of the circular mold. A layer of elastomer 26 (FIG. 3), also, for example, neoprene rubber, is then wrapped around the tension member formed by cords 23. Thereafter a layer of stretchable fabric 24b is wrapped around such rubber layer 26 and the structure is then removed from the circular mold in unvulcanized condition.

Figure 4:
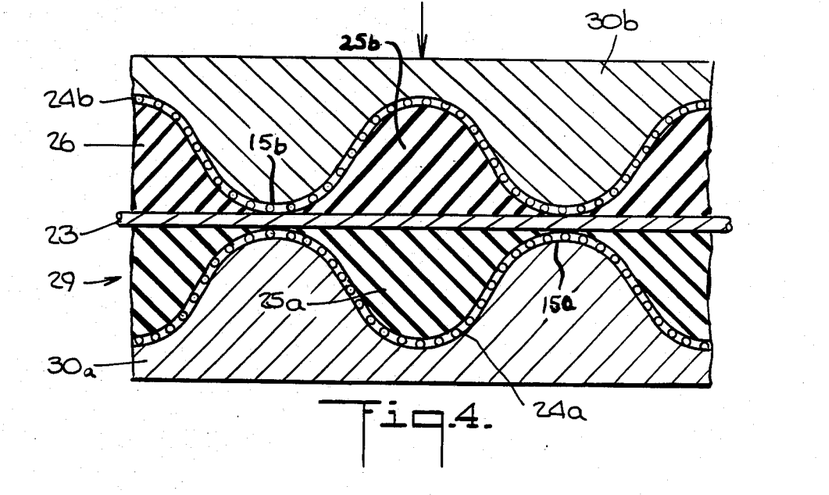
FIG. 4 is a longitudinal cross-sectional fragmentary view of the mold members of FIG. 3 shown in closed position, for final molding a belt according to the invention.

The structure is then placed in a standard C-frame heated press. The press platens, represented in FIGS. 3 and 4 of the drawings, comprise complementary toothed mold portions, i.e. an upper platen 30b and a lower platen 30a. The above structure is positioned in the lower platen 30a and the upper platen 30b is moved toward the lower platen under pressure. The upper platen 30b forms the outer teeth 14b by having the toothed mold surface thereof press the stretchable fabric 24b substantially into contact with the tension member 23 in the belt land areas 15b. The pressure exerted by the toothed mold surface 30b causes the elastomer 26 to flow into the groves of mold 30b, pushing the fabric 24b ahead of it. This fabric stretches until it conforms to the contour of the inner surface of mold member 30b, and the elastomer material forms the tooth body by filling the space 25b behind the fabric. Then, with the platens 30a and 30b in position to form the upper, i.e. outer teeth 14b, heat is applied by the press to vulcanize the section of the belt then located therein. After that section is vulcanized, the platens are moved apart and the next longitudinal section of belt is positioned in the lower mold member 30a, by the belt being indexed a predetermined amount. The process described above is then repeated until the entire belt is completed.

Figure 5:
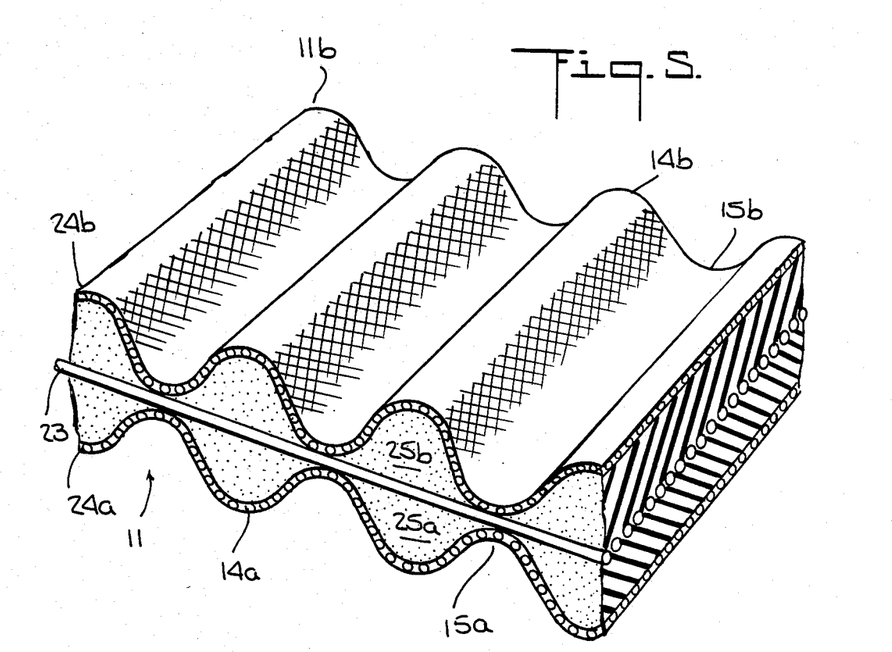
FIG. 5 is a fragmentary, perspective view of the double-acting power transmission belt shown in FIG. 1.

By the foregoing method an endless power transmission belt 11 (FIG. 5) is formed having power transmission teeth both on the inside and on the outside peripheral surfaces thereof. As a result of the different jacket constructions on the inside and outside surfaces, the teeth on the inside are more flexible than the teeth on the outside.

EXAMPLE

Several sample double-acting belts were constructed in accordance with the present invention, and were tested. Also, several sample double-acting belts were constructed in accordance with the construction of the prior art, i.e. both surfaces of the double-toothed sample belts were jacketed with "stretchable" fabric. These prior art belts were also tested and the results compared with the test results for belts according to the invention. The test results follow:

Three double-acting (i.e. double-toothed) power transmission belts in accordance with the present invention were prepared following the above-indicated general procedure from a single sleeve having a pitch of 14 mm and a length of 1400 mm.

The following materials of construction were employed:

Inner jacket: non-stretchable fabric, nylon 6,6, 42 warp yarns and 40 weft yarns per inch; yarn denier=1015; treated with RFL resin; porosity: 2.7 cubic feet of air per minute (ASTM D-735/75).

Tensile members: glass cord type H15 3/5

Outer jacket: stretchable fabric, nylon 6,6, 34 warp yarns and 26 weft yarns per inch; denier: weft yarns=1200, warp yarns=840.

Elastomer: polychloroprene; final cure: 370° F. for 4.5 minutes.

The samples were thus constructed with non-stretchable fabric covering the teeth on the inner peripheral surface of each of the belts and with stretchable fabric covering the teeth on the outer peripheral surface of each of the belts.

For comparison purposes three (3) double-toothed power transmission belts of the same dimensions were produced using the conventional method, i.e. stretchable fabric covering both the inner and outer peripheral surfaces, using the same mold as described above and the same curing conditions.

All of the belts were tested for length variations and "vibration" (defined below), as follows:

Each belt was trained around a pair of pulleys each having forty grooves. The drive pulley shaft was fixed in space while the parallel shaft of the driven pulley was movable transversely with respect to the drive pulley shaft. A tension of about 300 pounds was applied to the belt, and the drive pulley was rotated at 200 RPM. The average center-to-center distance between the axes of the two pulley shafts was determined during operation. This average center-to-center distance is a measure of the actual pitch length of the belt on the side of the belt meshing with the pulleys of the test apparatus, as compared with the designed pitch length of such belt. The maximum variation between center-to-center distance of the pulleys is known as "vibration" and is a measure of pitch irregularity on the side of the belt in mesh with the pulleys of the test apparatus.

The results of the tests were as follows:

| | Variation (inch × 10⁻³) | | | | | | | |
|---|---|---|---|---|---|---|---|---|
| | Invention Belt (non-stretchable fabric jacket on inner side and stretchable fabric jacket on outer side of double-acting belt) | | | | Conventional Belt (stretchable fabric jacket on both inner and outer sides of double-acting belt) | | | |
| Test Belt No. | 1 | 2 | 3 | Avg. | A | B | C | Avg. |
| Side 1 (inner) | | | | | | | | |
| Length | 2 | 10 | 10 | 7.33 | 20 | 6 | 8 | 11.33 |
| Vibration | 2 | 2 | 4 | 2.67 | 5 | 8 | 9 | 7.33 |
| Side 2 (outer) | | | | | | | | |
| Length | 7 | 6 | 1 | 4.67 | 45 | −46 | −52 | 47.67 |
| Vibration | 3 | 2 | 3 | 2.67 | 5 | 12 | 12 | 9.67 |

The "Side 2" test results, i.e. the measurements taken with respect to the teeth on the outer peripheral surface of each belt were accomplished by turning the belts inside out so that the outer peripheral surface became the inner peripheral surface, and then testing the belts in the same manner as described above.

The above chart indicates that highly uniform power transmission belts can be prepared using the teaching of this invention. Such double-acting belts of this invention outperform considerably similar belts using stretchable fabric as inside and outside jackets.

Figure 6:
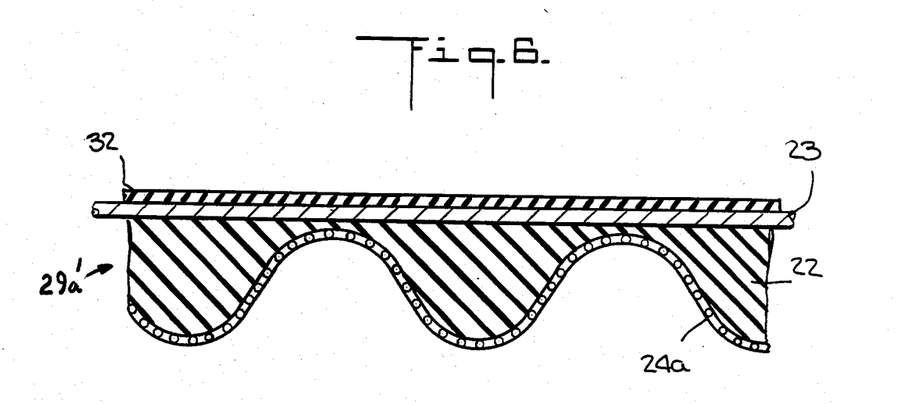
FIG. 6 is a longitudinal cross-sectional view of the pre-form of the belt according to another embodiment of the present invention.
Figure 7:
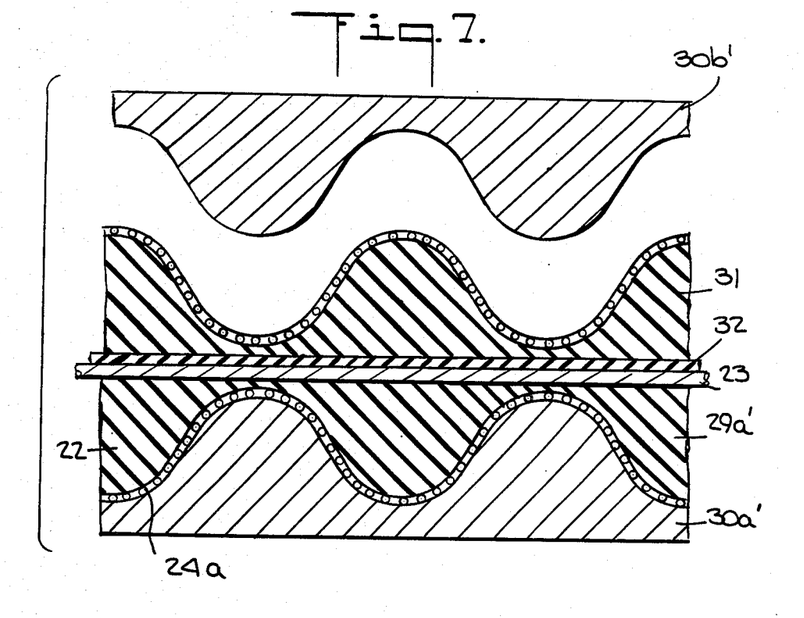
FIG. 7 is a longitudinal cross-sectional fragmentary view of opposed flat mold sections for final-forming and vulcanizing a double-acting belt in accordance with said other embodiment of the invention.
Figure 8:
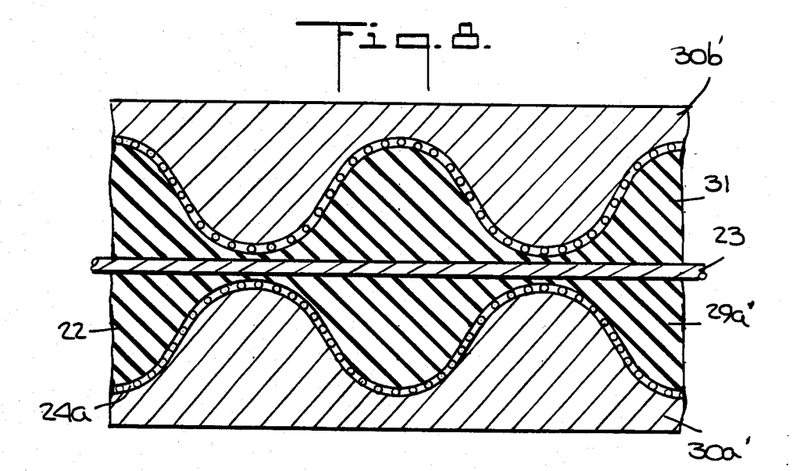
FIG. 8 is a longitudinal cross-sectional fragmentary view of the mold members of FIG. 7 shown in closed position for final molding of a belt according to said other embodiment of the invention.

While the foregoing represents one embodiment of the present invention, it will be understood that double-acting belts having "non-stretch" fabric not only on the inner peripheral side (as described above), but on both the inner and the outer sides thereof, are contemplated to be within the scope of this invention. As shown in FIGS. 6–8, such double-acting belts may be fabricated by first making two pre-forms in accordance with the procedure outlined above for making such a pre-form, except that only one of these pre-forms is then reinforced by winding a tension member 23 therearound. That pre-form is further provided with a thin rubber layer 32 (FIGS. 6 and 7) wrapped therearound prior to removal thereof from the drum. Such pre-form with tension member 23 and thin rubber layer 32 is designated by reference numeral 29a' in FIGS. 6 and 7. The second pre-form, without a tension member therein, is designated by the reference numeral 31 in FIG. 7. The pre-form 29a' is then positioned with a section thereof in the platen press as shown in FIG. 7 as follows: With the top mold 30b' in its upper, i.e. open position, the reinforced pre-form "sleeve" 29a' is mounted on two tension pulleys (not shown) located at each side of the bottom mold 30a' at about the same level as the bottom mold. A section of the pre-form 29a' is positioned until the teeth of pre-form 29a' fall exactly into the grooves of the bottom mold 30a'. An approximate length of the second pre-form 31, with its teeth facing upward, is then placed over the thin rubber layer 32 covering the tension member 23 of pre-form 29a' in the lower mold member 30a' and the teeth of pre-form 31 are aligned with the teeth of pre-form 29a'. The top mold member 30b' is then lowered to the position shown in FIG. 8, causing the tensile member to be fully encapsulated by the elastomer. The two mold members remain closed for the period of time needed to vulcanize the included section of the belt. The mold is subsequently opened, the sleeve 29a' is rotationally advanced a distance somewhat less than the length of the mold, the next adjacent section of pre-form 31, now overlying the top surface of the section of pre-form 29a' which is now in the mold, is adjusted to align the teeth thereof with the teeth on the pre-form 29a' and the procedure is repeated until the full sleeve length is cured.

Various modes of carrying out the invention are contemplated as being within the scope of the following claims, particularly pointing out and distinctly claiming the subject matter which is regarded as the invention.

What is claimed is:

1. A double-acting positive drive power transmission belt comprising an elastomeric body portion having an inner and an outer peripheral surface, a first plurality of power-transmitting elastomeric teeth integral with said body portion and distributed along said inner peripheral surface and each possessing a certain spring rate, a second plurality of power-transmitting elastomeric teeth integral with said body portion and distributed along said outer peripheral surface and each having a certain spring rate, a tensile band embedded in said body portion substantially at the dedendum line of each of said first and second pluralities of teeth, a first spring rate-modifying jacket of non-stretchable fabric formed over the teeth and over the load portions between the teeth of said first plurality of teeth, and a second spring rate-modifying jacket of stretchable fabric formed over the teeth and over the land portions between the teeth of said second plurality of teeth, said first jacket cooperating with said first plurality of teeth such that the spring rate of each tooth in said first plurality of teeth, covered with said first jacket, is from 1.2 times to 3 times the spring rate of that one of said first plurality of teeth in the absence of said first jacket, and said second jacket cooperating with said second plurality of teeth such that the spring rate of each tooth in said second plurality of teeth, covered with said second jacket, is greater than 3 times the spring rate of that one of said second plurality of teeth in the absence of said second jacket.

2. The positive drive power transmission belt of claim 1 wherein the spring rate of each tooth in said first plurality of teeth, covered with said first jacket, is from 1.4 times to 2.8 times the spring rate of that one of said first plurality of teeth in the absence of said first jacket.

3. The positive drive power transmission belt of claim 1 wherein said teeth in said first plurality of teeth are substantially identical in shape with and are directly opposed to said teeth in said second plurality of teeth.

4. The positive drive power transmission belt of claim 1 wherein said non-stretchable fabric constituting said first jacket has warp and weft yarns locked in place relative to each other so as to dimensionally stabilize said non-stretchable fabric.

5. The positive drive power transmission belt of claim 4 wherein a heat-set thermosetting resin cooperates with said warp and weft yarns of said non-stretchable fabric at least at the intersections thereof for locking them in place with respect to each other.

6. The positive drive power transmission belt of claim 5 wherein said heat-set thermosetting resin applied to said non-stretchable fabric at least partially obstructs the interstices of said non-stretchable fabric.

7. The positive drive power transmission belt of claim 5 wherein said non-stretchable fabric is balanced cloth bias-cut fabric the warp and weft yarns of which are made of nylon 6,6, said non-stretchable fabric has a thickness of approximately 0.029 inch and is woven to have approximately 42 warp ends per inch and approximately 40 weft ends per inch, and said heat-set thermosetting resin comprises RFL.

8. The positive drive power transmission belt of claim 4 wherein said warp and weft yarns of said non-stretchable fabric are interwoven sufficiently tightly as to have, when not locked in place relative to each other, a porosity of less than 30 cu. ft.min. of air flow.

9. A double-acting positive drive power transmission belt comprising an elastomeric body portion having an inner and an outer peripheral surface, a first plurality of power-transmitting elastomeric teeth integral with said body portion and distributed along said inner peripheral surface and each possessing a certain spring rate, a second plurality of power-transmitting elastomeric teeth integral with said body portion and distributed along said outer peripheral surface and each having a certain spring rate, a tensile band embedded in said body portion substantially at the dedendum line of each of said first and second pluralities of teeth, a first spring rate-modifying jacket of non-stretchable fabric formed over the teeth and over the land portions between the teeth of said first plurality of teeth, and a second spring rate-modifying jacket of non-stretchable fabric formed over the teeth and over the land portions between the teeth of said second plurality of teeth, said first jacket cooperating with said first plurality of teeth such that the spring rate of each tooth in said first plurality of teeth, covered with said first jacket, is from 1.2 times to 3 times the spring rate of that one of said first plurality of teeth in the absence of said first jacket, and said second jacket cooperating with said second plurality of teeth such that the spring rate of each tooth in said second plurality of teeth, covered with said second jacket, is from 1.2 times to 3 times the spring rate of that one of said second plurality of teeth in the absence of said second jacket.

10. The positive drive power transmission belt of claim 9 wherein said teeth in said first plurality of teeth are substantially identical in shape with and are directly opposed to said teeth in said second plurality of teeth.

11. The positive drive power transmission belt of claim 9 wherein said spring rate of each tooth in said first plurality of teeth, covered with said first jacket, is from 1.4 times to 2.8 times the spring rate of that one of said first plurality of teeth in the absence of said first jacket.

12. The positive drive power transmission belt of claim 11 wherein the spring rate of each tooth in said second plurality of teeth, covered with said second jacket, is from 1.4 times to 2.8 times the spring rate of that one of said second plurality of teeth in the absence of said second jacket.

13. The positive drive power transmission belt of claim 9 wherein each of said non-stretchable fabrics constituting said first and second jackets has warp and weft yarns locked in place relative to each other so as to dimensionally stabilize the respective non-stretchable fabrics.

14. The positive drive power transmission belt of claim 13 wherein a heat-set thermosetting resin cooperates with the respective warp and weft yarns of each of said non-stretchable fabrics at least at the intersections thereof for locking the associated warp and weft yarns in place with respect to each other.

15. The positive drive power transmission belt of claim 13 wherein said warp and weft yarns in each of said non-stretchable fabrics are interwoven sufficiently tightly as to have, when not locked in place relative to each other, a porosity of less than 30 cu. ft./min. of air flow.

16. The positive drive power transmission belt of claim 14 wherein said heat-set thermosetting resin applied to each of said non-stretchable fabrics at least partially obstructs the respective interstices of said non-stretchable fabrics.

17. The positive drive power transmission belt of claim 14 wherein each of said non-stretchable fabrics is a balanced cloth bias-cut fabric the warp and weft yarns of which are made of nylon 6,6, each non-stretchable fabric has a thickness of approximately 0.029 inch and is woven to have approximately 42 warp ends per inch and approximately 40 weft ends per inch, and said heat-set thermosetting resin comprises RFL.

18. A double-acting positive drive power transmission belt comprising an elastomeric body portion having an inner and an outer peripheral surface, a first plurality of power-transmitting elastomeric teeth integral with said body portion and distributed along one of said peripheral surfaces and each possessing a certain spring rate, a second plurality of power-transmitting elastomeric teeth integral with said body portion and distributed along the other of said peripheral surfaces and each possessing a certain spring rate, a tensile band embedded in said body portion intermediate said first and second pluralities of teeth, a first spring rate-modifying jacket of non-stretchable fabric formed over the teeth and over the land portions between the teeth of said first plurality of teeth, and a second spring rate-modifying second jacket of fabric formed over the teeth and over the land portions between the teeth of said second plurality of teeth, said first jacket cooperating with said first plurality of teeth such that the spring rate of each tooth in said first plurality of teeth, covered with said first jacket, is from 1.2 times to 3 times the spring rate of that one of said first plurality of teeth in the absence of said first jacket.

19. The positive drive power transmission belt of claim 18 wherein said fabric constituting said second jacket is a stretchable fabric and cooperates with said second plurality of teeth such that the spring rate of each tooth in said second plurality of teeth, covered with said second jacket, is greater than 3 times the spring rate of that one of said second plurality of teeth in the absence of said second jacket, whereby the jacketed teeth of said second plurality of teeth are less flexible than the jacketed teeth of said first plurality of teeth.

20. The positive drive power transmission belt of claim 19 wherein each of said fabrics constituting said first and second jackets includes warp and weft yarns interwoven with each other, said warp and weft yarns of said non-stretchable fabric are locked to each other at least at their intersections for minimizing entry of elastomeric material into the interstices of said non-stretchable fabric during the molding of said first plurality of teeth, and said warp and weft yarns of said stretchable fabric are not locked to each other so as to offer substantially no opposition to penetration of elastomeric material into the interstices of said stretchable fabric during the molding of said second plurality of teeth.

* * * * *